US008442269B2

(12) United States Patent
Lin et al.

(10) Patent No.: US 8,442,269 B2
(45) Date of Patent: May 14, 2013

(54) METHOD AND APPARATUS FOR TRACKING TARGET OBJECT

(75) Inventors: Shang-Yi Lin, Taichung (TW);
Chia-Chen Chen, Hsinchu (TW);
Wen-Shiou Luo, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 110 days.

(21) Appl. No.: 13/066,515

(22) Filed: Apr. 15, 2011

(65) Prior Publication Data
US 2012/0170804 A1 Jul. 5, 2012

(30) Foreign Application Priority Data

Dec. 31, 2010 (TW) ................................ 99147243 A

(51) Int. Cl.
*G06K 9/00* (2006.01)
(52) U.S. Cl.
USPC .......................................................... 382/103

(58) Field of Classification Search .................. 382/100, 382/103, 154, 203
See application file for complete search history.

(56) References Cited

U.S. PATENT DOCUMENTS
2003/0185445 A1* 10/2003 Chang et al. .................. 382/203
* cited by examiner

*Primary Examiner* — Duy M Dang
(74) *Attorney, Agent, or Firm* — J.C. Patents

(57) ABSTRACT

A method and apparatus for tracking a target object are provided. A plurality of images is received, and one of the images is selected as a current image. A specific color of the current image is extracted. And the current image is compared with a template image to search a target object in the current image. If the target object is not found in the current image, a previous image with the target object is searched in the images received before the current image. And the target object is searched in the current image according to an object feature of the previous image. The object feature and an object location are updated into a storage unit when the target object is found.

16 Claims, 9 Drawing Sheets

METHOD AND APPARATUS FOR TRACKING TARGET OBJECT

CROSS-REFERENCE TO RELATED APPLICATION

This application claims the priority benefit of Taiwan application serial no. 99147243, filed Dec. 31, 2010. The entirety of the above-mentioned patent application is hereby incorporated by reference herein and made a part of this specification.

TECHNICAL FIELD

The disclosure relates to a method for recognizing a target object, in particular, to a method and apparatus for dynamically tracking a target object.

BACKGROUND

As man-machine interaction interfaces are developing towards a design of user-friendly operation, computer control interfaces gradually evolve from conventional keyboards, mice, joysticks and touch apparatuses to operation interfaces that capture images of natural gestures or body motions. It is anticipated that technologies and applications related to gesture- and body-based interaction interfaces will become popular.

Conventionally, if it is intended to obtain an instruction of a markerless natural gesture or motion, an object feature in an image needs to be captured or matched by using an image processing technology in most cases. However, in a complex background environment, an image of an ordinary object or a natural gesture of a human body is easily interfered by variations of brightness, surrounding background or even other similar intrinsic features, which often results in unstable detection results. However, the human body, different from other hand-held remotes or specific apparatuses, does not have a fixed form, and in operation, gestures or body motions are generally subject to certain changes. Therefore, if only the color, template or movement track is used as a main feature for recognition, it is difficult to stably track the location of a target object (for example, a gesture). Therefore, in previous studies, the operating environment is usually limited under strict conditions (for example, pure background, light source with fixed brightness, and no other moving objects), thereby greatly limiting the application range. Meanwhile, as image processing generally involves a large amount of data operations, the response time is delayed, which cannot meet the requirement for real-time interaction.

SUMMARY

A method for tracking a target object is introduced herein. The method at least includes the following Steps A to E. In Step A, a plurality of images is received, and one of the images is selected as a current image. In Step B, a specific color of the current image is extracted. In Step C, the current image is compared with a template image to search a target object in the current image. In Step D, it is determined whether the current image contains the target object, and if yes, an object feature and an object location of the target object are updated into a storage unit; and if not, a next step is performed. In Step E, a micro processor is used to perform the following steps: a. searching a previous image with the target object in the images received before the current image; b. searching whether the current image contains the target object according to the object feature of the previous image; and c. finding the target object of the current image according to the object feature of the previous image, and updating the object feature and the object location of the current image into the storage unit.

An apparatus for tracking a target object is further introduced herein. The apparatus includes a storage unit and a micro processor. The micro processor is coupled to the storage unit and programmed to perform the following Steps A to E. In Step A, a plurality of images is received, and one of the images is selected as a current image. In Step B, a specific color of the current image is extracted. In Step C, the current image is compared with a template image to search a target object in the current image. In Step D, it is determined whether the current image contains the target object, and if yes, an object feature and an object location of the target object are updated into the storage unit; and if not, a next step is performed. In Step E, the micro processor is used to perform the following steps: a. searching a previous image with the target object in the images received before the current image; b. searching whether the current image contains the target object according to the object feature of the previous image; and c. finding the target object of the current image according to the object feature of the previous image, and updating the object feature and the object location of the current image into the storage unit.

Several exemplary embodiments accompanied with figures are described in detail below to further describe the disclosure in details.

BRIEF DESCRIPTION OF THE DRAWINGS

The patent or application file contains at least one drawing executed in color. Copies of this patent or patent application publication with color drawing(s) will be provided by the United States Patent and Trademark Office upon request and payment of the necessary fee.

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Generally, in a complex background environment, an image of an ordinary object or a natural gesture of a human body is easily interfered by variations of brightness, surrounding background or even other similar intrinsic features, which often results in unstable detection results. Meanwhile, as image processing generally involves a large amount of data operations, the response time is delayed, thereby failing to function effectively. Therefore, the disclosure provides a method and apparatus for tracking a target object, so as to improve the stability and accuracy of target object tracking. In order to make the content of the disclosure clearer, embodiments are described below as examples according to which the disclosure can be surely implemented.

First Embodiment

Figure 1:
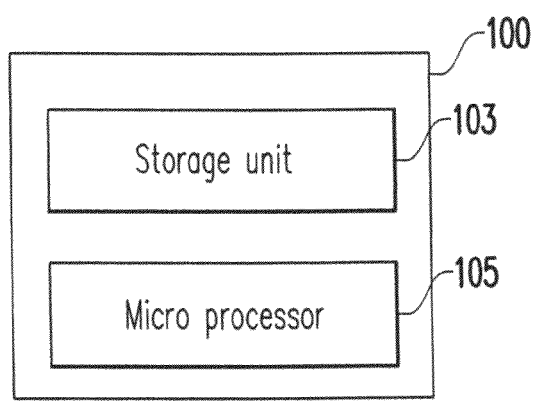
FIG. 1 is a block diagram illustrating an apparatus for tracking a target object according to a first embodiment of the disclosure.

FIG. 1 is a block diagram illustrating an apparatus for tracking a target object according to a first embodiment of the disclosure. Referring to FIG. 1, the apparatus 100 for tracking a target object includes a storage unit 103 and a micro processor 105. The micro processor 105 is coupled to the storage unit 103.

The micro processor 105 is programmed to perform a method for tracking a target object. For example, a computer readable storage medium is used to store a computer program for execution by the tracking micro processor 105 to electronically automatically complete the method for tracking a target object. Here, the micro processor 105 may receive an image captured by an image capturing unit through a Universal Serial Bus (USB) or IEEE 1394 transmission interface. The micro processor 105 may store the captured image into the storage unit 103 (for example, a memory) first, and then implement the method for tracking a target object. An embodiment is provided below to describe in detail the steps of the method for tracking a target object.

Figure 2:
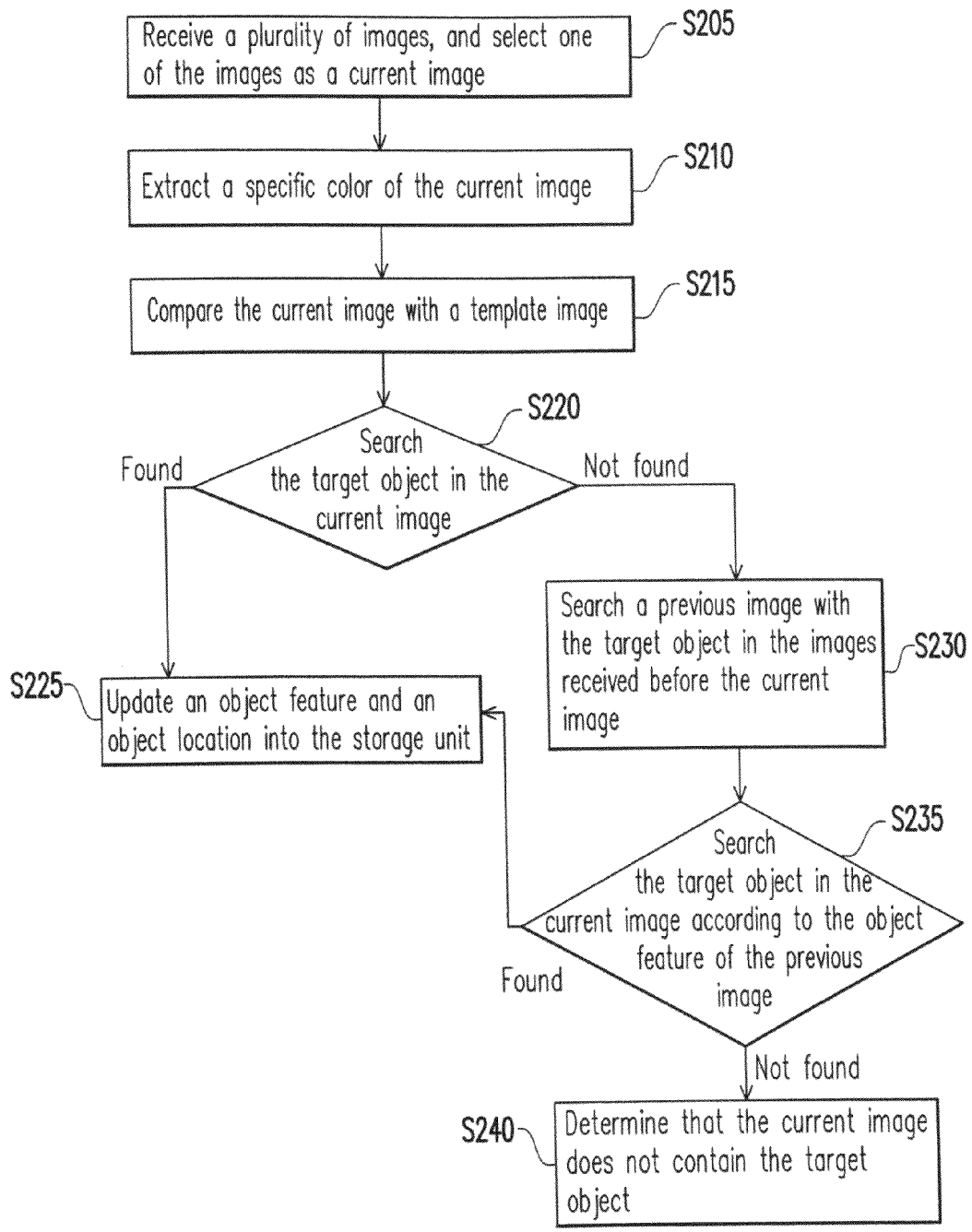
FIG. 2 is a flow chart illustrating a method for tracking a target object according to the first embodiment of the disclosure.

FIG. 2 is a flow chart illustrating a method for tracking a target object according to the first embodiment of the disclosure. Referring to FIG. 2, in Step S205, a plurality of images is received, and one of the images is selected as a current image. Next, in Step S210, a specific color of the current image is extracted. For example, a color image is converted into a gray-level image according to a specified color ratio.

Figure 3:
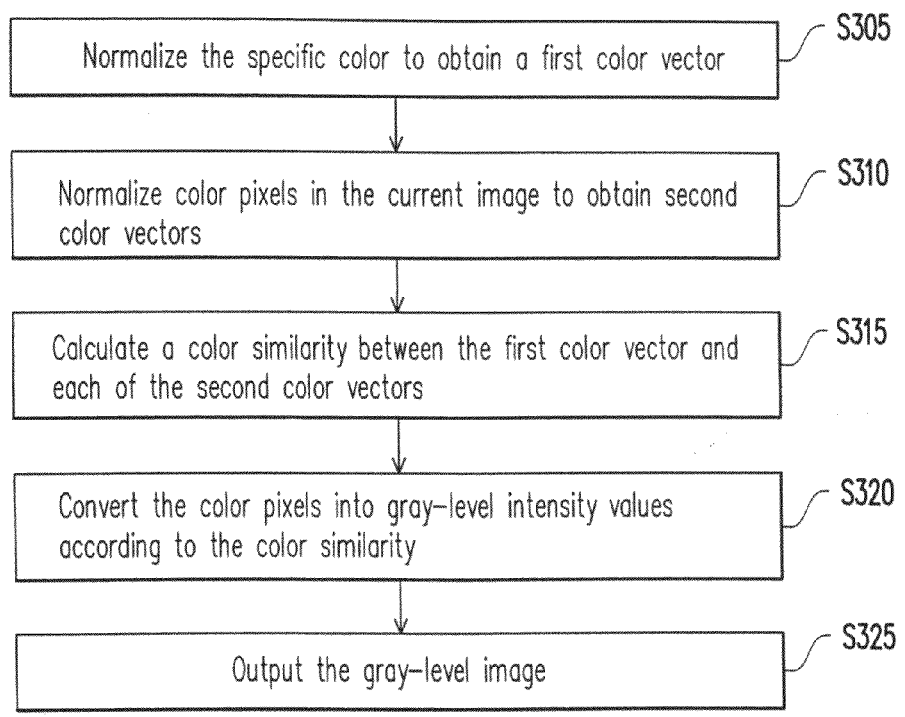
FIG. 3 is a flow chart illustrating a method for extracting a specific color according to the first embodiment of the disclosure.

For example, FIG. 3 is a flow chart illustrating a method for extracting a specific color according to the first embodiment of the disclosure. Referring to FIG. 3, in Step S305, a color is specified as the specific color, and the specific color is normalized to obtain a first color vector. Here, a method for specifying a color may be presetting the color of the target object, or specifying a certain color in the current image as the specific color by a user in use.

For example, when the color of the target object is known, the color of the target object may be specified as the specific color in advance (for example, if the target object is a hand, the skin color may be used as the specific color). In addition, the specific color may also be specified according to a selection on a displayed picture by the user, that is, the user specifies the color of the target object in the displayed picture. For example, a frame is provided in the displayed picture to allow the user to use the frame to select the specific color in the displayed picture. Moreover, a self-learning mechanism may also be used for the user to specify the color of the target object. For example, the user swings the target object rapidly in front of an image capturing unit (for example, a camera), so as to obtain a color distribution in a moving block in an image. The color distribution is analyzed to find the most frequently-occurring color in the moving block in the image, and the color is used as the specific color. The specific color may be specified by one or all of the above methods for specifying the specific color.

Next, in Step S310, color pixels in the current image are normalized to obtain second color vectors. For example, for a red-green-blue (RGB) color space, an RGB value of each pixel in the current image is obtained, and the RGB value of each pixel is normalized to obtain the second color vector.

Then, in Step S315, a color similarity between the first color vector and each of the second color vectors is calculated. For example, an interpolation is performed on the first color vector of the specific color and the second color vectors of the color pixels of the current image respectively to respectively obtain a color similarity between each of the color pixels and the specific color.

Afterwards, in Step S320, the color pixels are converted into gray-level intensity values according to the color similarity, that is, the current image is converted into a gray-level image. Finally, as shown in Step S325, the gray-level image is output.

In this embodiment, the color pixels are converted into the gray-level intensity values according to the following formula:

$$I = w^n \times V_{max}, n \geq 1.$$

Figure 4:
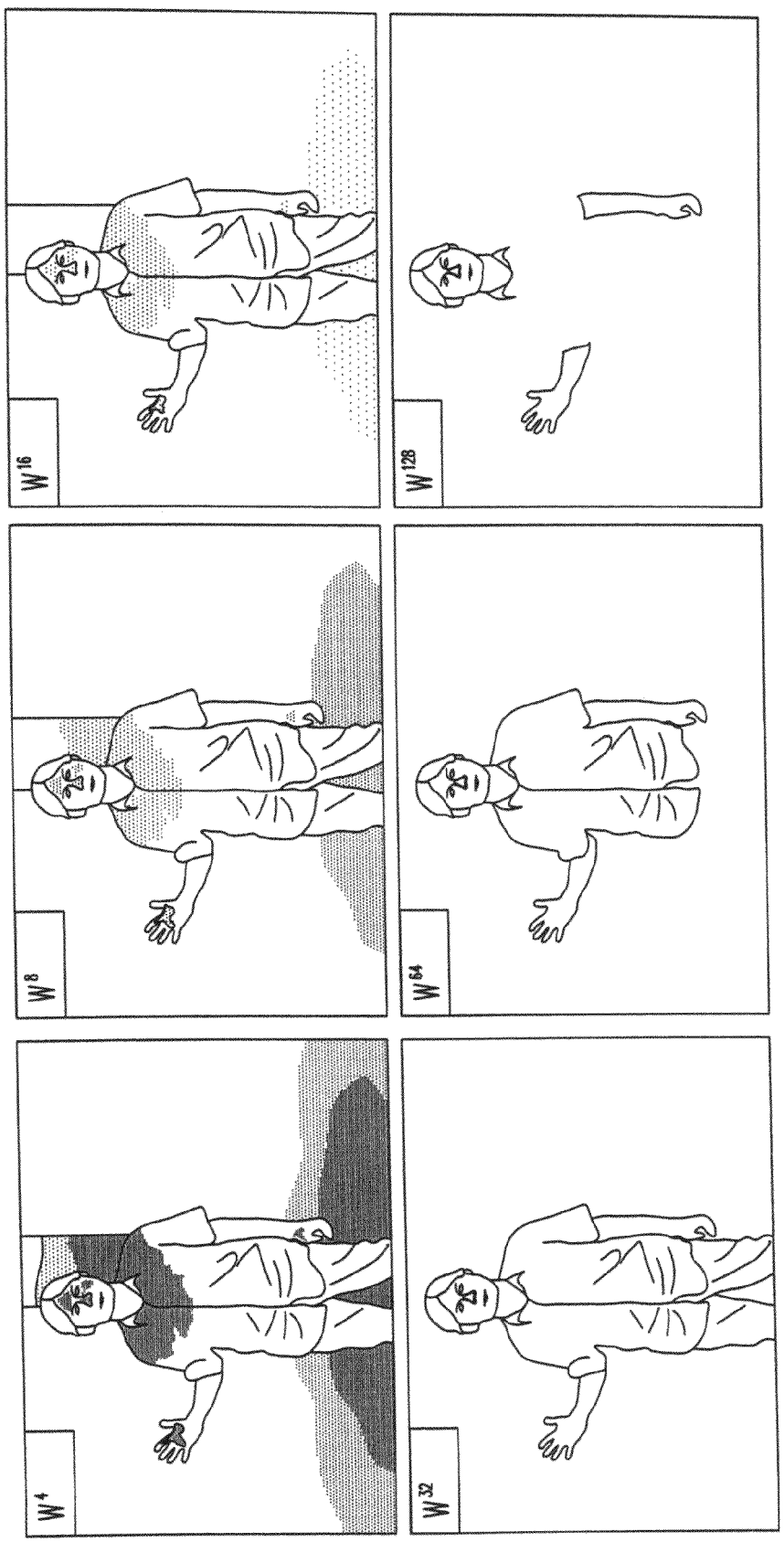
FIG. 4 is a schematic diagram illustrating an image from which a specific color is extracted according to the first embodiment of the disclosure.
Figure 10:
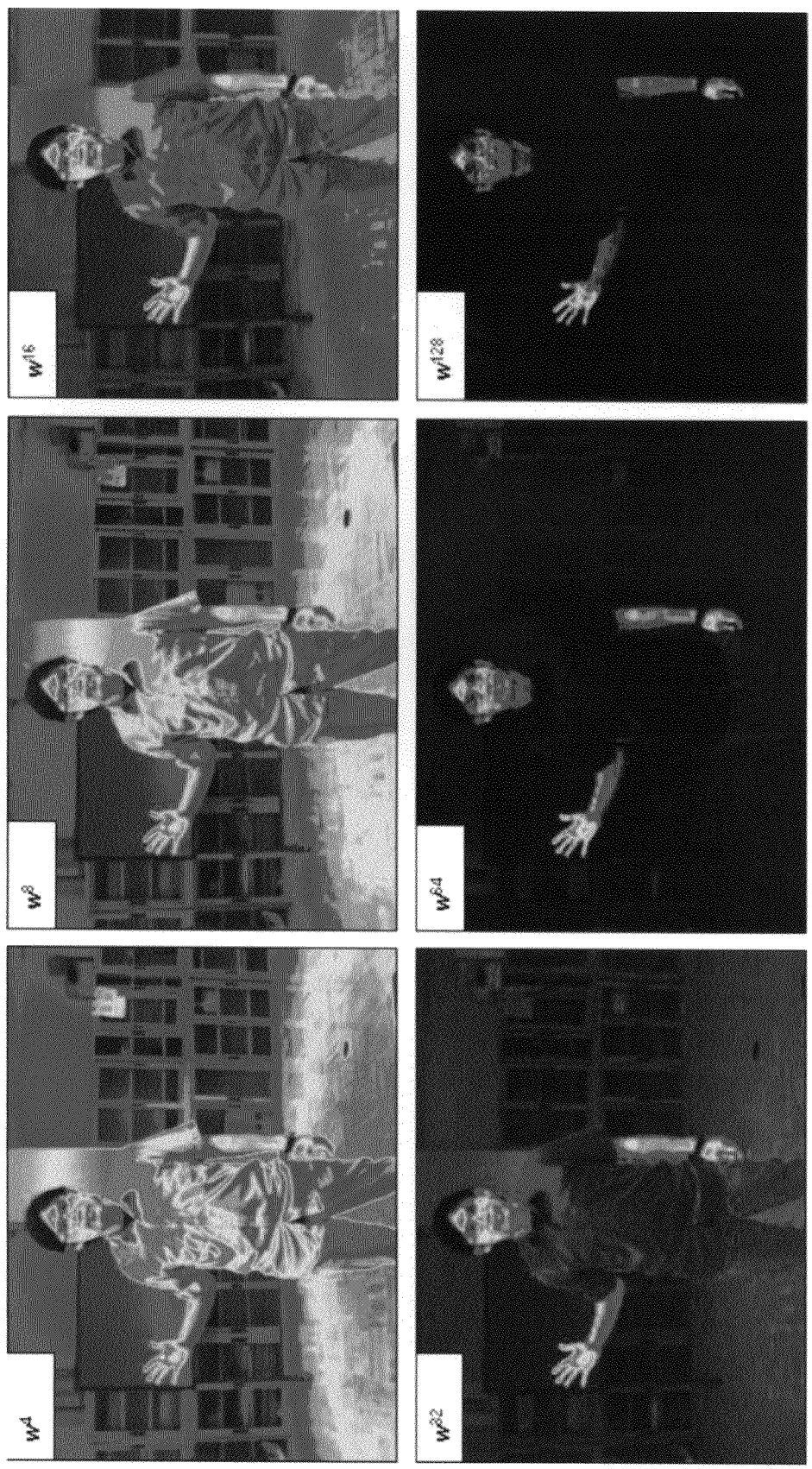
FIG. 10 is a color graph corresponding to FIG. 4.

In the formula, w is the color similarity, that is, the color similarity w is obtained after performing the interpolation on the first color vector and the second color vectors, $V_{max}$ is a maximum RGB value in the color pixels, I is the gray-level intensity value, and n is a coefficient for adjusting the color similarity. The larger the coefficient n is, the greater the influence of the color similarity w on the gray-level image obtained after conversion will be. For the convenience of recognition, the gray-level intensity values may be converted into hues (referring to FIG. 10 for details), so that the intensity values can be known through colors more clearly, for example, a high intensity portion is red, and a low intensity portion is blue. FIG. 4 is a schematic diagram illustrating an image from which a specific color is extracted according to the first embodiment of the disclosure. Thus, objects irrelevant to the specific color can be filtered out by adjusting the coefficient n of the color similarity w.

Figure 5:
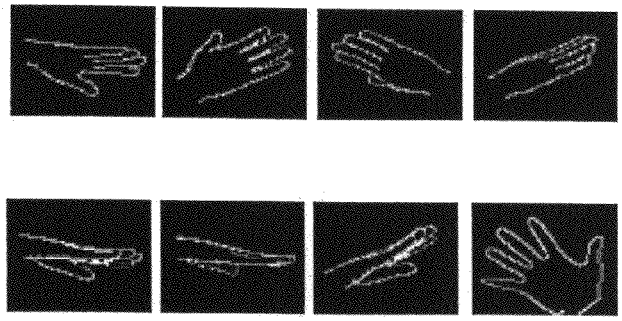
FIG. 5 is a schematic diagram illustrating a template image database according to the first embodiment of the disclosure.

Referring to FIG. 2, after the specific color is extracted, in Step S215, the current image is compared with a template image. Furthermore, as shown in Step S220, the target object is searched in the current image. For example, an object edge in the gray-level image is calculated, and the object edge is divided into eight directions, so as to match the gray-level image with the pre-established template image in the eight directions respectively, to find an optimal matching result. It can be determined according to the matching result whether the current image contains an object conforming to the template image. Here, a template image database may be established in advance, as shown in FIG. 5. FIG. 5 is a schematic diagram illustrating a template image database according to the first embodiment of the disclosure. Thus, at least one image may be selected from the template image database to serve as the template image.

Figure 6:
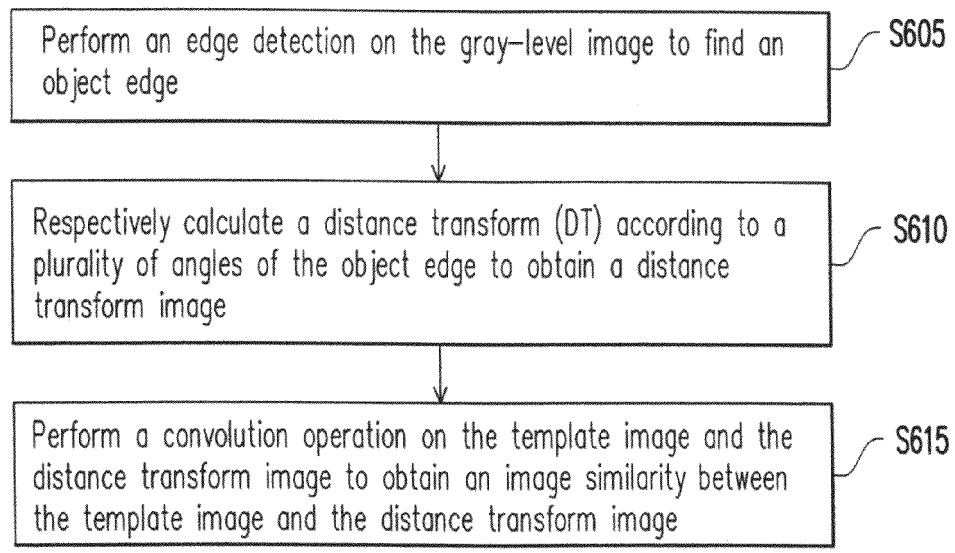
FIG. 6 is a flow chart illustrating a method for template matching according to the first embodiment of the disclosure.

FIG. 6 is a flow chart illustrating a method for template matching according to the first embodiment of the disclosure. Referring to FIG. 6, in Step S605, an edge detection is performed on the gray-level image to find an object edge. Then, angles of the object edge are calculated according to gradient values of X and Y directions. Next, in Step S610, a distance transform (DT) is respectively calculated according to a plurality of angles of the object edge to obtain a distance transform image. For the purpose of parallel operation, the detected object edge is divided into eight directions, which are respectively [0°-45°], [45°-90°], [90°-135°], [135°-180°], [180°-225°], [225°-270°], [270°-315°] and [315°-360°]. The distance transform is respectively calculated in the eight directions of the object edge.

Then, in Step S615, a convolution operation is performed on the template image and the distance transform image to obtain an image similarity between the template image and the distance transform image. In this embodiment, the image similarity between the template image and the distance transform image is calculated according to the following formula:

$$e = \sum_{i=0}^{M} \sum_{j=0}^{N} [DT(x+i, y+j) \times g(i, j)] - N_{edge}.$$

In the formula, M is the width of the template image, N the height of the template image, DT represents the distance transform image, g represents the template image, $N_{edge}$ is the pixel number of the object edge in the template image, and e is the image similarity. Here, the template image may be moved in the distance transform image for matching of different blocks, so as to find a location with the highest image similarity of the template image in the distance transform image. That is to say, after the convolution operation is performed on the template image and the distance transform image, the image similarity e between the template image and the distance transform image can be obtained by adjustment according to the object edge in the template image.

After the image similarity with the template image is obtained, it is determined whether the image similarity is lower than a threshold ($Th_{template}$). For example, the threshold $Th_{template}$ is set to 10. The image similarity is that when the template image is matched with the distance transform image, the object edge of the template image is also an object edge in the corresponding distance transform image or pixels near the object edge. If the image similarity is higher than the threshold $Th_{template}$, it is determined that the object corresponding to the object edge obtained by matching is the target object. On the contrary, if the image similarity is lower than the threshold, it is determined that the object corresponding to the object edge obtained by matching is not the target object.

In addition, if multiple groups of object edges are generated after the edge detection is performed, the object edges are matched with the template image on by one, so as to find the object edge most similar to the template image.

Referring to FIG. 2, in Step S220, if the target object is found in the current image, Step S225 is performed to update an object feature and an object location of the target object into the storage unit 103. The object feature includes shape information, color information, depth information or movement track information.

If the target object is not found in the current image, Step S230 is performed to search a previous image with the target object in the images received before the current image. Furthermore, in Step S235, the target object is searched in the current image according to the object feature of the previous image. If the target object of the current image is found according to the object feature of the previous image, Step S225 is performed to update the object feature and the object location of the current image into the storage unit 103. On the contrary, if the target object is not found in the current image according to the object feature of the previous image, as shown in Step S240, it is determined that the current image does not contain the target object.

That is to say, after finding the target object in the current image, the micro processor 105 updates the object feature and the object location into the storage unit 103, so that when the target object cannot be found in a next image by using the template image, the target object can be tracked according to the object feature and the object location in the storage unit 103. In addition, if an error occurs during tracking the target object, the error can be corrected in the next image by using the template image.

Second Embodiment

Figure 7A:
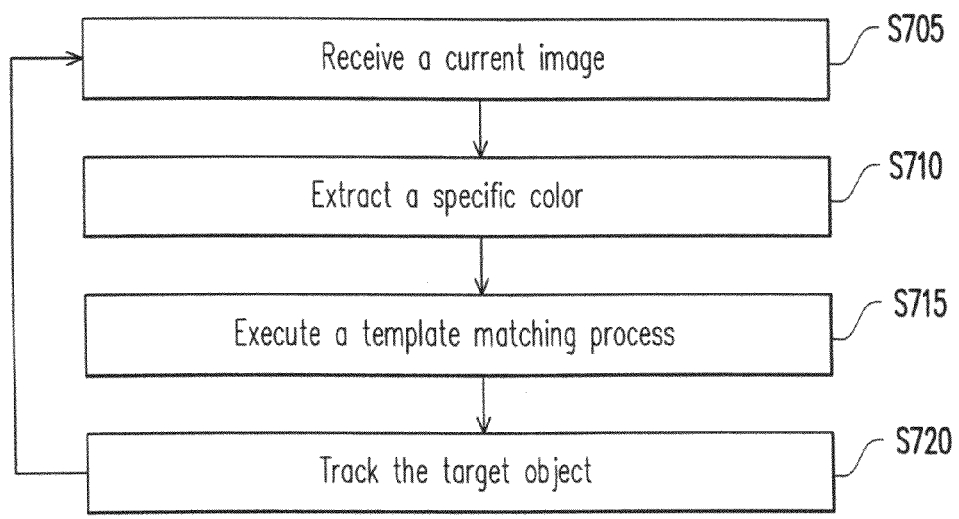
FIG. 7A and FIG. 7B are flow charts illustrating a method for tracking a target object according to a second embodiment of the disclosure.
Figure 7B:
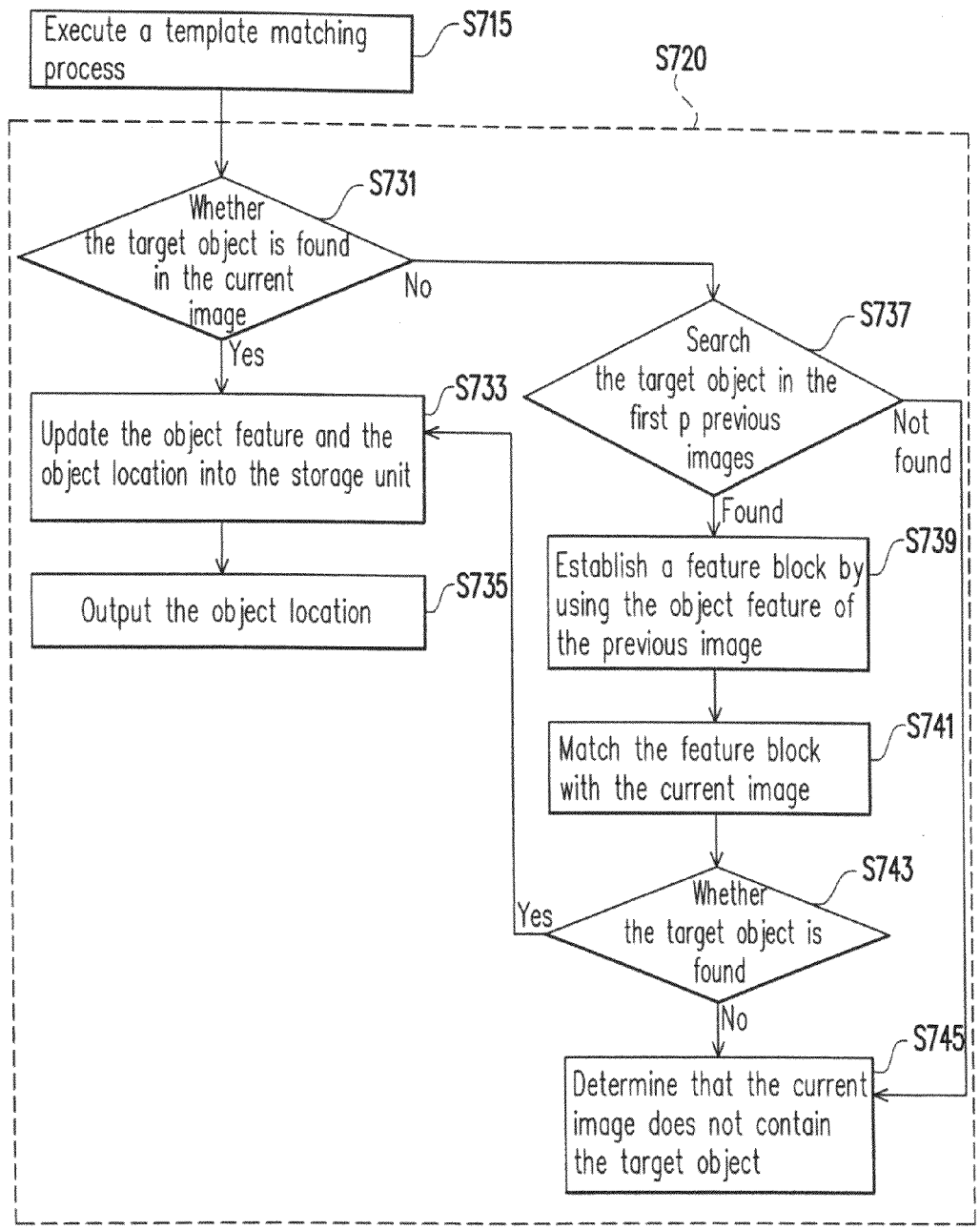

FIG. 7A and FIG. 7B are flow charts illustrating a method for tracking a target object according to a second embodiment of the disclosure.

Referring to FIG. 1 and FIG. 7A, the micro processor 105 performs Step S705 to Step S720. In Step S705, a current image is received. Next, in Step S710, a specific color is extracted. For example, a color image is converted into a gray-level image. Then, in Step S715, a template matching process is executed to find a block (that is, a target object) similar to a template image from the current image. Step S710 and Step S715 of this embodiment are respectively similar to Step S210 and Step S215 of the first embodiment, so that the details will not be described herein again.

Afterwards, in Step S720, the target object is tracked. For example, the current image is further matched with an object feature in a previous image to find an object location in the current image. Sub-steps of Step S720 are as shown in FIG. 7B. In Step S731, it is determined whether the target object is found in the current image. For example, after an image similarity with the template image is obtained, it is determined whether the image similarity is lower than a threshold $Th_{template}$. If the image similarity is higher than the threshold $Th_{template}$, it is determined that the object being matched is the target object. On the contrary, if the image similarity is lower than the threshold $Th_{template}$, it is determined that the object being matched is not the target object.

If the target object is found in the current image, as shown in Step S733, the object feature and the object location are updated into the storage unit. Then, in Step S735, the object location is output. For example, the object location is presented in the displayed picture.

On the other hand, if the target object is not found in the current image, as shown in Step S737, the target object is searched in the first p previous images, where p is a positive integer greater than or equal to 1.

Generally, the amount of movement of the target object in consecutive images is not too large; therefore, the object feature found in the previous image can be used to search the target object in the current image. For example, it is assumed that the target object is searched in the first 10 previous images. If the target object is not found in the first 10 previous images, Step S745 is performed to determine that the current image does not contain the target object.

If the target object is found in one of the first 10 previous images, Step S739 is performed to establish a feature block by using the object feature of the previous image. Then, in Step S741, the feature block is matched with the current image. Furthermore, in Step S743, it is determined whether the target object is found. For example, shape information, color information, depth information or movement track information of the target object is used as the object feature.

Specifically, a feature block (for example, an $N_x \times N_y$ feature block, $N_x N_y$) may be established by using the object feature of the previous image. Then, a corresponding search range is searched in the current image according to the object location of the previous image. The target object is searched in the current image within the search range by using the feature block. For example, a matching block is selected within the search range in the current image. Afterwards, a pixel number of the matching block matching with the feature block is calculated. If the pixel number is greater than a threshold $Th_{block}$, it is determined that the matching block is the target object.

In addition, for the shape information of the target object, firstly, color segmentation is performed on the gray-level image obtained after the color extraction, and an $N_x \times N_y$ feature block is defined by taking the location of the target object as the center to serve as the object feature. $N_x$ is a pixel number in a horizontal direction, $N_y$ is a pixel number in a vertical direction, and $N_x$ and $N_y$ are each a positive integer greater than or equal to 1. By taking the object location of the previous image as the center, a shape similar to the target object of the previous image is searched near the corresponding location of the current image. For example, an XNOR logic operation is executed for the feature block and the search range for rapid matching, a pixel number of the matching block corresponding to the feature block is calculated as a similarity, a location with the highest similarity is searched, and the threshold $Th_{block}$ is set to determine whether the target object is found. It is assumed that $Th_{block}=N_x \times N_y \times 0.8$, which represents that 80% of pixels in the matching block need to be the same as the feature block of the previous image. If the target object is found, the object feature is updated, and the object location is returned. If the target object is not found, it is considered that the target object has disappeared from the image.

In addition, the color information or depth information of the target object may also be used as the object feature. Likewise, an $N_x \times N_y$ feature block is defined by taking the object location as the center, and color distribution or depth location and distribution in the feature block is used as the object feature. The object location is searched near the corresponding location of the current image according to the object location of the previous image.

The depth information may be obtained, for example, by an ordinary correlation method. Since it only needs to match the depth information of an object that may be the target object, a block similar to the target object in color may be obtained by color segmentation first, and then edge information of the block is calculated by edge detection, so as to calculate a correlation by using the edge information, thereby obtaining depth information of the block. Through such a method, the depth information of the target object can be obtained rapidly, so as to accelerate the matching process.

Moreover, the movement track information of the target object may also be used as the object feature. When the target object continuously appears in the images, a movement velocity of the target object can be calculated by using the locations of the target object in two consecutive images. When the $N_x \times N_y$ feature block is used for searching, the location of the target object in the current image may be estimated first, and then the target object is searched by taking the estimated location as the center. Through such a method, the location of the target object can also be tracked when the target object is moving rapidly, thereby preventing the target object from moving out of the search range.

It should be noted that, after the target object is found in the current image, the specific color in the specific color extraction may be updated. When color extraction is performed for a next image, the color of the target object in the current image can be used as the specific color. Such a mechanism can adapt to the current color of the target object in real time when the ambient light source changes or the color of the target object gradually changes, thereby avoiding a step of specifying the color of the target object again.

Third Embodiment

Figure 8:
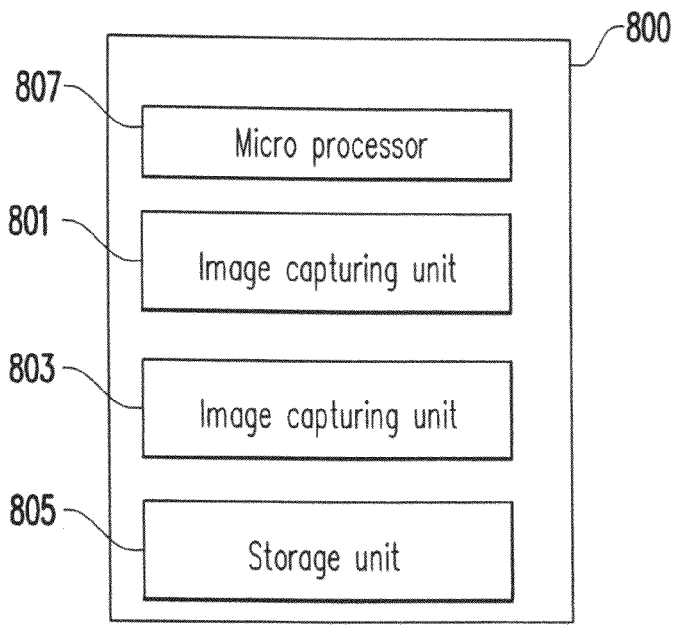
FIG. 8 is a block diagram illustrating an apparatus for tracking a target object according to a third embodiment of the disclosure.

FIG. 8 is a block diagram illustrating an apparatus for tracking a target object according to a third embodiment of the disclosure. Referring to FIG. 8, the apparatus 800 for tracking a target object includes an image capturing unit 801, an image capturing unit 803, a storage unit 805 and a micro processor 807. In this embodiment, internal parameters and external parameters of the image capturing unit 801 and the image capturing unit 803 are corrected in advance for the convenience of subsequent operations.

The image capturing unit 803 and the image capturing unit 801 continuously capture images at different viewing angles. The micro processor 807 may detect the object location of the image captured by the image capturing unit 801 according to Step S205 to Step S240 of the first embodiment or according to Step S705 to Step S720 of the second embodiment, and store the object location into the storage unit 805. Next, the micro processor 807 reads the object location and the object feature of the current image captured by the image capturing unit 801, and calculates an epipolar line of the image capturing unit 803 according to the object location and the object feature. The epipolar line is an intersection line of any epipolar plane with an image plane of the image capturing unit 801 and the image capturing unit 803 (for example, cameras disposed at left and right sides). Furthermore, the object feature of the image capturing unit 801 is used to search the object location on the epipolar line of the image captured by the image capturing unit 803, and three-dimensional coordinates of the target object are calculated according to the object location respectively obtained by the image capturing unit 801 and the image capturing unit 803.

Figure 9:
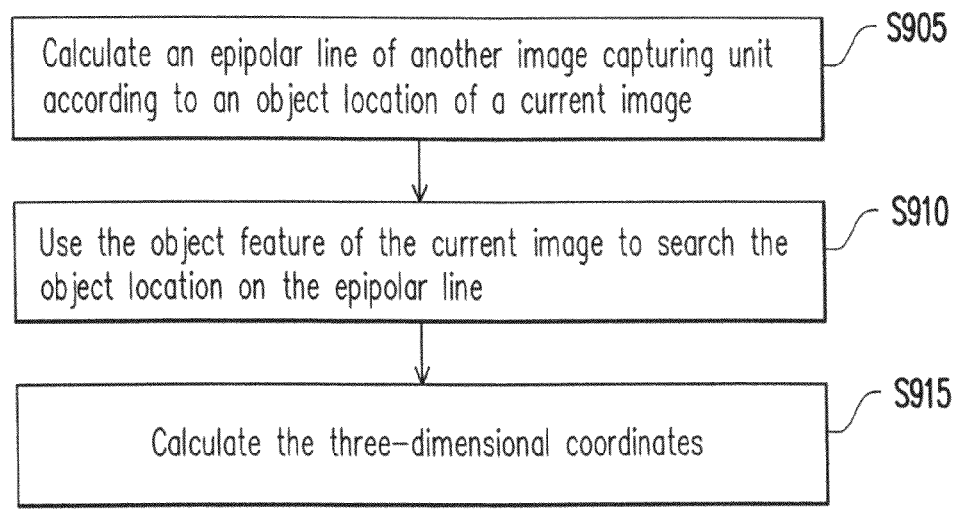
FIG. 9 is a flow chart illustrating a method for calculating three-dimensional coordinates according to the third embodiment of the disclosure.

FIG. 9 is a flow chart illustrating a method for calculating three-dimensional coordinates according to the third embodiment of the disclosure. Referring to FIG. 9, in Step S905, an epipolar line of a second image capturing unit (for example, the image capturing unit 803) is calculated according to an object location of a current image captured by a first image capturing unit (for example, the image capturing unit 801). In addition, in other embodiments, if the apparatus 800 for tracking a target object has other image capturing units, epipolar lines of the other image capturing units may also be calculated by using the object feature obtained by the image capturing unit 801.

Next, in Step S910, the object feature of the current image obtained by the image capturing unit 801 is used to search the object location on the epipolar line of the image captured by the image capturing unit 803. Then, in Step S915, three-dimensional coordinates of the target object are calculated according to the object location respectively obtained by the image capturing unit 801 and the image capturing unit 803.

Thus, through matching of the target object on the epipolar line, not only the positions of the target object in other image capturing units can be calculated more rapidly, but also an error introduced when the three-dimensional coordinates of the target object are calculated can be effectively reduced.

In addition, in other embodiments, two image capturing units may also be used to calculate the three-dimensional coordinates of the target object. For example, object locations of respective images captured by different image capturing units may be tracked by the method according to the first embodiment and the second embodiment, and then the three-dimensional coordinates of the target object are calculated by using the object locations.

Based on the above, in the above embodiments, markerless target object tracking is carried out based on the computer vision matching technology. The method for tracking a target object is based on intrinsic features such as color and shape, dynamically updates the object feature with reference to changes of the previous images in the tracking process, and provides a determination mechanism, thereby effectively improving the reliability and accuracy of tracking. Thus, after the target object is found, the object feature and the object location are updated into the storage unit, so that when the target object cannot be found in a next image by template matching, the target object can be tracked according to the object feature and the object location in the storage unit. In addition, if an error occurs during tracking the target object, the error can be corrected in the next image by template matching. The method for tracking a target object according to the above embodiments is not only applicable to two-dimensional target object tracking, but also applicable to three-dimensional target object tracking.

Meanwhile, in order to achieve real-time tracking, a possible range for image matching may be estimated according to the color information, movement track information or depth information of the target object first, so as to reduce the amount of data operations, and a multi-core parallel processing architecture may be adopted to accelerate the operation process.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for tracking a target object, comprising:
   A. receiving a plurality of images, and selecting one of the images as a current image;
   B. extracting a specific color of the current image;
   C. comparing the current image with a template image to search a target object in the current image;
   D. determining whether the current image contains the target object, and if yes, updating an object feature and an object location of the target object into a storage unit; and if not, performing a next step:
   E. using a micro processor to perform the following steps:
      a. searching a previous image with the target object in the images received before the current image;
      b. searching whether the current image contains the target object according to the object feature of the previous image; and
      c. finding the target object of the current image according to the object feature of the previous image, and updating the object feature and the object location of the current image into the storage unit.

2. The method for tracking a target object according to claim 1, wherein the step B comprises:
   respectively performing an interpolation on a vector converted from the specific color and vectors converted from a plurality of color pixels of the current image to respectively obtain a color similarity between each of the color pixels and the specific color; and
   converting the current image into a gray-level image according to the color similarity, wherein the step is to respectively convert the color pixels into a gray-level intensity value according to the following formula:

$I = w^n \times V_{max}, n \geq 1$;

wherein w is the color similarity, $V_{max}$ is a maximum red-green-blue (RGB) value in the color pixels, I is the gray-level intensity value, and n is a coefficient for adjusting the color similarity.

3. The method for tracking a target object according to claim 1, wherein the step C comprises:
   performing an edge detection on the gray-level image to find an object edge;
   respectively calculating a distance transform according to a plurality of angles of the object edge to obtain a distance transform image; and
   performing a convolution operation on the template image and the distance transform image to obtain an image similarity between the template image and the distance transform image; and
   the step D comprises:
   comparing the image similarity with a first threshold to determine whether an object corresponding to the object edge is the target object;
   if the image similarity is greater than the first threshold, determining that the object corresponding to the object edge is the target object; and
   if the image similarity is not greater than the first threshold, determining that the object corresponding to the object edge is not the target object.

4. The method for tracking a target object according to claim 1, further comprising:
   specifying the specific color, by at least one of the following methods:
   presetting the specific color;
   specifying the specific color according to a selection on a displayed picture by a user; and
   automatically searching the target object in the displayed picture through a self-learning mechanism, and extracting the color of the target object as the specific color.

5. The method for tracking a target object according to claim 1, wherein the step b comprises:
   b-1. establishing a feature block by using the object feature of the previous image;
   b-2. searching a corresponding search range in the current image according to the object location of the previous image; and
   b-3. searching whether the current image contains the target object within the search range by using the feature block.

6. The method for tracking a target object according to claim 5, wherein the object feature comprises at least one of shape information, color information, depth information and movement track information of the target object.

7. The method for tracking a target object according to claim 5, wherein the step b-3 comprises:
   selecting a matching block within the search range;
   calculating a pixel number of the matching block matching with the feature block; and
   if the pixel number is greater than a second threshold, determining that the matching block is the target object.

8. The method for tracking a target object according to claim 1, wherein after the step b, the method further comprises:
   if the target object is not found in the current image according to the object feature of the previous image, determining that the current image does not contain the target object.

9. The method for tracking a target object according to claim 1, further comprising:
   using a first image capturing unit to capture the images;
   calculating an epipolar line of a second image capturing unit according to the object location of the current image;

using the object feature of the current image to search the object location on the epipolar line of an image captured by the second image capturing unit; and calculating three-dimensional coordinates of the target object according to the object location respectively obtained by the first image capturing unit and the second image capturing unit.

10. An apparatus for tracking a target object, comprising:
a storage unit, and
a micro processor, coupled to the storage unit, and programmed to perform the following steps:
A. receiving a plurality of images, and selecting one of the images as a current image;
B. extracting a specific color of the current image;
C. comparing the current image with a template image to search a target object in the current image;
D. determining whether the current image contains the target object, and if yes, updating an object feature and an object location of the target object into the storage unit; and if not, performing a next step:
E. using the micro processor to perform the following steps:
   a. searching a previous image with the target object in the images received before the current image;
   b. searching whether the current image contains the target object according to the object feature of the previous image; and
   c. finding the target object of the current image according to the object feature of the previous image, and updating the object feature and the object location of the current image into the storage unit.

11. The apparatus for tracking a target object according to claim 10, further comprising:
a first image capturing unit, coupled to the micro processor, for capturing the images; and
a second image capturing unit, coupled to the micro processor, for capturing another image at a different viewing angle;
wherein the micro processor calculates an epipolar line of the second image capturing unit according to the object location of the current image, uses the object feature of the current image to search the object location on the epipolar line of the image captured by the second image capturing unit, and calculates three-dimensional coordinates of the target object according to the object location respectively obtained by the first image capturing unit and the second image capturing unit.

12. The apparatus for tracking a target object according to claim 10, wherein the step B performed by the micro processor comprises:
respectively performing an interpolation on a vector converted from the specific color and vectors converted from a plurality of color pixels of the current image to respectively obtain a color similarity between each of the color pixels and the specific color; and
converting the current image into a gray-level image according to the color similarity, wherein the step is to respectively convert the color pixels into a gray-level intensity value according to the following formula:

$$I = w^n \times V_{max}, n \geq 1;$$

wherein w is the color similarity, $V_{max}$ is a maximum red-green-blue (RGB) value in the color pixels, I is the gray-level intensity value, and n is a coefficient for adjusting the color similarity.

13. The apparatus for tracking a target object according to claim 10, wherein the step C performed by the micro processor comprises: performing an edge detection on the gray-level image to find an object edge, respectively calculating a distance transform according to a plurality of angles of the object edge to obtain a distance transform image, and performing a convolution operation on the template image and the distance transform image to obtain an image similarity between the template image and the distance transform image; and
the step D performed by the micro processor comprises: comparing the image similarity with a first threshold to determine whether an object corresponding to the object edge is the target object; if the image similarity is greater than the first threshold, determining that the object corresponding to the object edge is the target object; and
if the image similarity is not greater than the first threshold, determining that the object corresponding to the object edge is not the target object.

14. The apparatus for tracking a target object according to claim 10, wherein the micro processor specifies the specific color by at least one of the following methods:
presetting the specific color;
specifying the specific color according to a selection on a displayed picture by a user; and
automatically searching the target object in the displayed picture through a self-learning mechanism, and extracting the color of the target object as the specific color.

15. The apparatus for tracking a target object according to claim 10, wherein the step b performed by the micro processor comprises: establishing a feature block by using the object feature of the previous image, and searching a corresponding search range in the current image according to the object location of the previous image; and selecting a matching block within the search range, calculating a pixel number of the matching block matching with the feature block, and if the pixel number is greater than a second threshold, determining that the matching block is the target object.

16. The apparatus for tracking a target object according to claim 10, wherein the object feature comprises at least one of shape information, color information, depth information and movement track information of the target object.

* * * * *